March 3, 1964          H. KREISKORTE          3,123,728
VIBRATORY APPARATUS WITH VARIABLE FREQUENCY AND AMPLITUDE
Filed Jan. 18, 1961
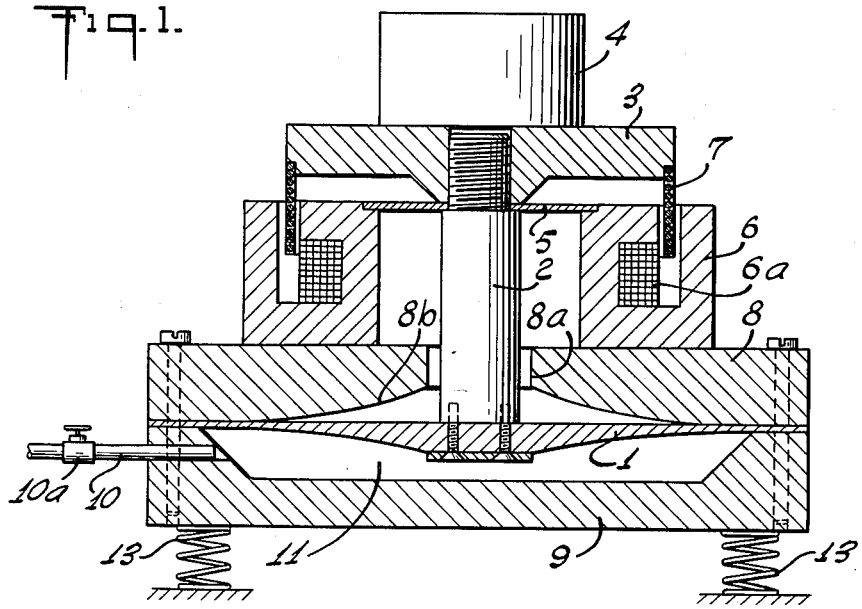
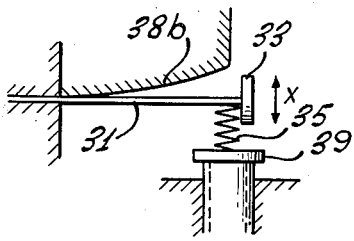
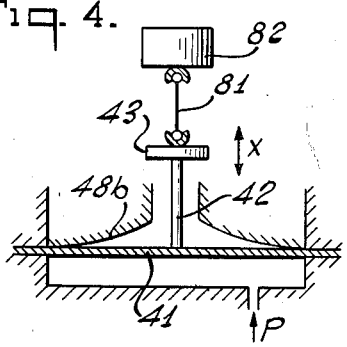
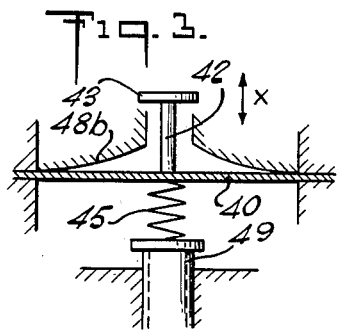
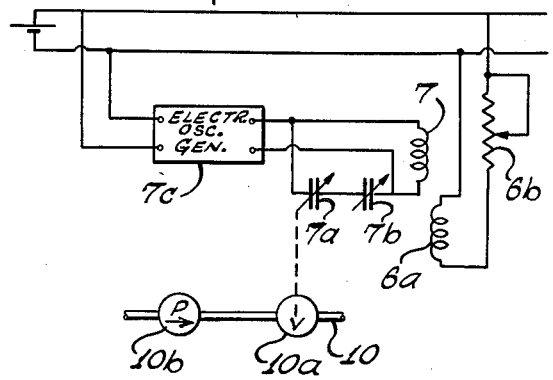

United States Patent Office 3,123,728
Patented Mar. 3, 1964

3,123,728
VIBRATORY APPARATUS WITH VARIABLE FREQUENCY AND AMPLITUDE
Heinz Kreiskorte, Darmstadt, Germany, assignor to Carl Schenck Maschinenfabrik G.m.b.H., Darmstadt, Germany, a corporation of Germany
Filed Jan. 18, 1961, Ser. No. 83,513
Claims priority, application Germany Jan. 22, 1960
14 Claims. (Cl. 310—19)

My invention relates to vibratory apparatus for shake tables, material testing equipment and other oscillatory machinery of continuously changeable vibration frequency and amplitude.

Shake tables, embodying a mechanical vibratory system, are being used for various purposes, such as for testing vibration-sensitive devices or calibrating oscillation-responsive measuring instruments. Some known shake tables are directly driven by a crank mechanism. In such machines, as a rule, the vibration amplitude can be changed only at standstill because a considerable mechanical expenditure would be required to afford amplitude variation during continuous operation. This has always been considered disadvantageous because a change in vibratory travel amplitude is often necessary for establishing not only a desired mutual correlation of frequency and amplitude but also a constant velocity or acceleration amplitude; but this necessitates providing for controllable variation in travel amplitude as well as for controllable change in frequency.

In another known type of shake table, the entire energy for accelerating the table as well as any specimen located thereon, is generated by electronic means. It has also been attempted to provide a practically applicable resonance system whose natural frequency can be changed continuously during operation of the machine. According to one such proposal, the elastic constant of a mechanical oscillatory system, comprising a mass and a spring, is to be varied by continuous variation of the effective spring length. Realization of this proposal in practice encounters excessive difficulties due to the limit conditions of the spring mounting and clamping means. Particularly at high frequencies, any clearance and friction at the clamping location impairs the oscillation characteristics of the device. If the change in spring constant is effected by partially blocking a helical spring with the aid of a screw nut, the difficulties due to indefinite limit conditions are aggravated considerably by danger of damaging the spring due to notching stresses.

Referring to mechanical vibratory devices of the above-mentioned type, particularly for shake tables or dynamic material testing machines, it is an object of my invention to eliminate the above-mentioned shortcomings and to provide a machine that, operating substantially in resonance with an oscillation generator, readily affords varying the mechanical vibration amplitude as well as the frequency during continuous operation with the aid of simple and reliable mechanical means that require a relatively small amount of expenditure in material and occupy but relatively little space.

To this end and in accordance with my invention, I provide the mechanical vibratory system with a rigid abutment member adjacent to the spring means of the system, such spring means consisting preferably of a leaf or diaphragm spring, and provide on the abutment member and on the spring respective surface areas which face each other and are progressively contactable with each other, at least one of the two surface areas being curved so as to vary the active size or length of the spring means when the spring is urged toward the abutment member. I further provide the device with controllable forcing means which are elastically joined with the spring of the oscillatory system for tensioning it into the above-mentioned controllable contact engagement with the rigid abutment member, thus permitting a continuous variation in spring constant and hence in natural frequency of the mechanical vibratory system.

According to another feature of the invention the above-mentioned forcing means comprise a supply of gas, preferably air, under controllable pressure which acts to tension the spring of the mechanical vibratory system and can be set to a constant pressure value corresponding to the desired resonance frequency of the system. It is essential for the invention that the device operate substantially in resonance. That is, the vibrating system of the device is provided or connected with an oscillation generator whose frequency is adjusted substantially in accordance with the adjustable frequency of the vibrating system to be excited. Due to operation near resonance, only a portion of the accelerating force need be generated by the exciting generator. Furthermore, when providing for a sufficiently high resonance maximum, the temporal course or wave shape of the exciting oscillation does not have an appreciable effect upon the wave shape of the vibratory mechanical system to be excited. That is, a pulse-wise excitation can be used for nevertheless causing the vibratory mechanical system of the machine to perform satisfactorily approximate sinusoidal oscillations. The amplitude of such shake tables or other vibration machines according to the invention can readily be adjusted as desired. This can be done, for example, by slightly changing the excitation frequency in the ascending or descending range of the resonance curve, or by changing the excitation power applied to the oscillatory system if the system is to operate at or near the resonance maximum.

The foregoing and more specific features of the invention will be explained in the following with reference to the embodiments illustrated by way of example on the accompanying drawings, the essential features of my invention being set forth with particularity in the claims annexed hereto.

FIG. 1 shows schematically a shake table according to the invention in vertical, central section.

FIGS. 2 to 4 illustrate schematically three different modifications of oscillatory devices; and FIG. 5 is a schematic electric circuit diagram for devices as shown in FIGS. 1, 3 and 4.

The shake table shown in FIG. 1 comprises a circular supporting base composed of an upper plate 8 and a lower plate 9. The supporting base is mounted on a fixed and rigid bed or foundation by means of elastic members such as helical compression springs 13 of which preferably four are uniformly distributed along the periphery of the supporting base. The plates 8 and 9 form together a hollow interior space which is partitioned into an upper chamber and a lower chamber by a diaphragm-like steel body 1 of circular shape which acts as a spring for the oscillatory mechanical system of the machine. The peripheral edge portion of the spring body 1 is firmly clamped between the upper and lower plates 8, 9 which are tightly secured together by vertical bolts (not shown) uniformly distributed over the periphery. The lower chamber 11 within the supporting structure is sealed from the upper chamber, whereas the upper chamber is in free communication with the ambient atmosphere through a central bore 8a of plate 8. Mounted upon the spring body 1 and firmly guided thereby is a vertical column or plunger 2 which carries the circular table structure 3 of the machine. Mounted on top of the plate 8 is the magnetic field system of an electrodynamic driver. This field system may essentially consist of a permanent magnet or of an electromagnet, the latter type of magnet being shown. The field system comprises a magnetizable iron structure 6 with an energizing winding 6a. The driver also comprises a moving coil 7 which is concentrically mounted on the table structure 3 and is freely movable in the vertical direction within the annular field gap of the field structure 6. An elastic diaphragm 5 is peripherally secured to the field structure 6 and has its center portion joined with the table structure 3 and the plunger 2 to reliably guide them for axial vibratory motion in the vertical direction. A test specimen 4 is shown placed upon the table top of structure 3.

The vibratory resonance system of the machine is constituted by the diaphragm spring body 1, which constitutes the elastic member of the system, and by the total vibratory mass composed mainly of the plunger 2, the table structure 3 and the specimen 4. This system, during operation, is excited by the exciter 6, 7 at the natural frequency or in the vicinity of this frequency. It should be understood that in lieu of the illustrated electrodynamic exciter, other suitable exciters may be used, for example a reaction-type exciter operating with a rotating or reciprocating unbalanced mass, such as an unbalanced flywheel, spring-force exciters or pneumatic exciters. It should also be noted that while the vibratory system is shown to vibrate vertically, the system can also be made to vibrate horizontally or in any other direction as may be required for the particular purpose of the machinery.

For permitting a continuous variation in natural frequency of the vibratory system, the lower chamber 11 inside the supporting structure 8, 9 has a duct to which a gas-pressure supply line 10 is attached. The supply line 10 comprises a pressure control valve 10a and is connected to a suitable source 10b (FIG. 6) of compressed gas, preferably air, such as an air compressor or pressure accumulator. For each change in air pressure within the chamber 11, the diaphragm member 1 assumes a new zero position. Increasing the pressure drives the diaphragm spring 1 upwardly. The upper plate 8, at the annular area facing the diaphragm spring 1 has a curved and generally concave shape. Consequently, when the diaphragm spring 1 is forced upwardly by gas pressure, it increases its area of contact with the upper plate 8 of the support so that the elastically active diametrical length of the diaphragm spring is correspondingly reduced. Such reduction is tantamount to a corresponding change in the spring constant and hence causes an increase in natural frequency of the oscillatory system. When the pressure in chamber 11 is reduced, the inverse effect is obtained so that the natural freequency of the oscillatory system decreases. Consequently, by controlling or regulating the air pressure in chamber 11, the desired continuous variation in natural frequency can readily be secured.

In order to attain a greater range of frequency, it is preferable to make the modulus of elasticity of the elastic member 1 greater near its center than near the periphery. For this purpose, the diaghragm 1 in the embodiment of FIG. 1 has greater thickness in its middle portion than at the clamped peripheral edge. As a result, and aside from the above-mentioned effect of the change in active diameter, the desirable effect upon the change in spring constant is augmented by the change in average modulus of elasticity.

As mentioned, the driver 6, 7 must be excited to operate at or near the resonance frequency of the mechanical vibratory system. This not only reduces the power requirements of the oscillation generator but also affords adjusting the mechanical amplitude of vibration by a slight variation of the frequency along the ascending or descending portion of the resonance curve, or by a change in excitation amplitude.

According to FIG. 5, the moving coil 7 of the driver forms part of a tank circuit together with capacitors 7a and 7b. The tank circuit forms part of an electronic oscillator 7c shown energized from a current source which is also used for energizing the magnet coil 6a through an adjusting rheostat 6b. The capacitance of capacitor 7a can be changed in order to properly tune the frequency of the oscillator tank circuit to the natural frequency of the mechanical vibratory system, the latter frequency being dependent upon the air pressure in chamber 11 controlled by the valve 10a. The variable capacitor 7a is shown in FIG. 6 to be linked with the valve 10a so that a change in air pressure and hence in natural frequency of the mechanical system is accompanied by a corresponding frequency change of the exciter. Another capacitor 7b of the tank circuit may serve for calibrating purposes or for slightly varying the frequency along the ascending or descending portion of the resonance plate in order to thereby vary the travel amplitude of the system. Aside from the tank circuit, the electronic oscillator is not further shown because such electronic devices are generally known and available in the trade.

It will be understood from the foregoing that the invention provides for continuous variation in the behavior of a mechanical vibratory system such as used for a shake table or a dynamic material testing machine, by providing two elastic bodies or media which are tensioned against each other, namely the diaphragm spring 1 on the one hand and the elastic medium in chamber 11 on the other hand.

The same principle can be embodied by other means, such as exemplified in FIGS. 2 and 3.

According to FIG. 2, a body 33, constituting the mass of the vibratory system, is held on one end of a leaf spring 31 which extends substantially horizontally and has its other end rigidly fastened or clamped to a supporting structure. The top area of the leaf spring 61 faces a curved area of a member 38b which forms a rigid part of the supporting structure. By means of an auxiliary spring 35, shown to be of the helical compression type, the leaf spring 31 can be pressed more or less against the curved area 38b with the result of changing the active elastic length of the leaf spring and hence the spring constant and natural frequency of the mechanical vibratory system. The just-mentioned changes are effective by means of a rigid abutment member 39 which forms an adjustable support for the auxiliary spring 35. Shifting the abutment member 39 upwardly causes an increase in natural frequency.

According to FIG. 3, the elastic medium in the chamber 1 of FIG. 1 is substituted by auxiliary spring 45 abutting against a vertically displaceable abutment member 49. The spring body 41, which may consist of a circular diaphragm or of an elongated leaf spring, is firmly clamped to the support and carries on its middle portion a plunger 42 with a specimen or shaker-table top 43 to be subjected to vibration. Depending upon the setting of the abutment member 49, the spring body 41 is pressed more or less against the curved area 48b, thus adapting the spring constant of body 41 to the particular requirements.

In devices of the type shown in FIGS. 2 and 3, the displaceable abutment is preferably gauged together with the frequency control member of the oscillation exciter, for example in the manner shown for valve 10a in FIG. 6.

Relative to all embodiments of the invention, it will be understood that the direction of vibratory movement, indicated in FIGS. 2 and 3 by a double-headed arrow $x$, can be given any desired orientation, for example in the horizontal rather than vertical direction. A vibratory device according to the invention may further be used for connection with an additional mechanism suitable for applying oscillatory load upon a specimen or workpiece. An example for a dynamic material testing machine of this type is shown in FIG. 5. The machine of FIG. 5 is to a large extent similar to that of FIG. 1. A diaphragm spring body 41 is rigidly clamped along its peripheral portion and has its center joined with a plunger 42 which carries a table or other mass structure 43. The spring body 41 subdivides the supporting structure into an upper and lower chamber, the lower chamber being provided with air pressure supply means at p for tensioning the spring 41 against a curved area 40b of the supporting structure in the manner and for the purpose already explained.

Located above the table structure 43 in FIG. 4 is a mass 82 which may be mounted or guided for vibration along the axis of the vibratory system formed by parts 41, 42, 43. The table 43 and the mass structure 82 are provided with respective clamping means for attaching therebetween a specimen rod 81. In order to excite the vibratory system, which, after insertion of the specimen 81 also comprises the mass structure 82 as well as the specimen, the forces required for accelerating the mass structure 82 must necessarily be transmitted through the specimen rod 81. These forces therefore operate as testing forces such as required for examining fatigue phenomena in the specimen.

For testing purposes, a machine as shown in FIGS. 1 to 4 may also be provided with specimen clamping means at the supporting base 8, 9 and at the mass or table structure 3, 33 or 43 so that the specimen rod extends between support and table structure.

It will be understood by those skilled in the art, upon studying this disclosure, that my invention permits of a variety of modifications and applications and hence can be given embodiments other than as particularly illustrated and described herein, without departing from the essential features of my invention and within the scope of the claims annexed hereto.

I claim:

1. A vibratory mechanical device of continuously changeable vibration frequency and amplitude for shake tables, material testing apparatus and other vibratory machinery, comprising an inherently rigid support, a mass structure, spring means elastically joining said structure with said support and forming a vibratory system together with said structure, excitation means operatively connected with said system for exciting it to substantially resonant oscillations, said support having a rigid member adjacent to said spring means, said member and said spring means having respective areas facing each other and progressively contactable with each other so as to vary the active size of said spring means when said spring means is urged toward said member, and controllable forcing means connected with said support and elastically associated with said spring means for tensioning said spring means into controllable contact with said member area to thereby continuously vary the spring constant of said spring means.

2. In an oscillatory device according to claim 1, said spring means extending symmetrically across the vibratory axis of said system, at least one of said respective areas of said spring means and member having a continuous curvature and being spaced from the other a great distance near said axis than at points remote therefrom, whereby said forcing means permit gradually varying the active length of said spring means.

3. In an oscillatory device according to claim 2, said forcing means comprising an elastically compressible medium engaging said spring means on the side opposite said rigid member of said support.

4. An oscillatory mechanical device of continuously changeable oscillation frequency and amplitude for shake tables, material testing apparatus and other oscillatory machinery, comprising a support, a circular spring disc peripherally clamped to said support, a mass structure connected with said spring disc at the center thereof and forming together with said disc an oscillatory system whose oscillation axis is coincident with the center axis of said disc, excitation means connected with said mass for exciting said system to oscillations, said support having a rigid member adjacent to said spring disc, said member and said disc having respective coaxial areas curved away from each other so as to have their greatest mutual spacing near said axis, and controllable pressure means elastically joined with said spring disc for forcing it toward said member area to thereby continuously vary the active diameter of said spring disc.

5. In an oscillatory device according to claim 4, said controllable pressure means comprising a pressure chamber located between said spring disc and said support on the disc side away from said member, and gas pressure supply means connected with said chamber and containing pressure control means.

6. An oscillatory mechanical device of continuously changeable oscillation frequency and amplitude for shake tables, material testing apparatus and other oscillatory machinery, comprising a support, a mass structure, spring means elastically joining said structure with said support and forming an oscillatory system together with said mass structure, said support having a rigid member adjacent to said spring means, said member and said spring means having respective areas facing each other and progressively contactable with each other so as to vary the active size of said spring means when said spring means is urged toward said member, controllable forcing means joined with said support and elastically joined with said spring means for tensioning said spring means into controllable contact with said member area to thereby continuously vary the spring constant of said spring means and thereby the natural frequency of said system, excitation means connected with said mass structure and having excitation-frequency control means connected with said forcing means for exciting said system to oscillate substantially at its natural frequency.

7. In an oscillatory device according to claim 1, said excitation means comprising an electrodynamic driver having a field magnet and an armature of which one is mounted on said support and the other on said mass structure, and an electric excitation circuit connected with said driver and having an adjustable frequency for exciting said system substantially in resonance.

8. In an oscillatory device according to claim 1, said spring means extending symmetrically across the oscillatory axis of said system, at least one of said respective areas of said spring means and member having a continuous curvature and being spaced from the other a greater distance near said axis than at points remote therefrom, said spring means having a larger cross-sectional thickness near said axis than at its junction with said support.

9. In an oscillatory device according to claim 1, said spring means comprising a leaf spring clamped at one end to asid support and joined at the other end with said mass structure, said area of said rigid member being curved away from the clamped end of said spring so that the active length of said spring decreases when progressively forcing it toward said member, and said forcing means having a displaceable stop and an auxiliary spring between said stop and said leaf spring.

10. In an oscillatory device according to claim 4, said controllable pressure means comprising a stop structure displaceable along said axis, and an elastically compressible member mounted between said stop structure and said spring disc.

11. An oscillatory device according to claim 1 for dynamic testing of materials, comprising two specimen-attaching means mounted on said mass structure and on said support respectively for fastening therebetween a specimen to be tested.

12. An oscillatory device according to claim 1 for dynamic testing of materials, comprising an auxiliary mass body, and two specimen-attaching means mounted on said body and said structure for fastening therebetween a specimen to be tested.

13. An oscillatory mechanical device for continuously changeable oscillation frequency and amplitude for shake tables, material testing apparatus and other oscillatory machinery, comprising a rigid bed structure, a hollow support, elastic means mounting said support on said bed structure to permit vibratory motion of said support, a vertical central plunger guided on said support for vertical oscillatory motion relative thereto, a table structure having a horizontal table top and being secured to said plunger, said support having a top portion with a central bore traversed with clearance by said plunger, a circular diaphragm spring located substantially horizontally in the hollow of said support and having a peripheral edge portion rigidly clamped to said support, said spring dividing said hollow into upper and lower chambers respectively, said plunger being fastened to said spring at the center thereof, said table structure and said plunger jointly constituting the mass of an oscillatory system comprising said spring and having a natural frequency determined by the active diametrical length of said spring, said spring and said support having in said upper chamber respective annular areas facing each other, said area of said support being generally concave and being spaced from the other a greater distance near said plunger than near said edge, and controllable gas-pressure supply means communicating with said lower chamber for forcing said spring into progressively variable mutual contact of said two areas whereby said active spring length is controllable by the gas pressure, and an oscillation generator of adjustable frequency operatively joined with said system for exciting it at a frequency near the natural frequency of said system.

14. In an oscillatory device according to claim 13, said oscillation generator comprising magnetic field means mounted on said support and a moving coil attached to said table structure, an electric oscillator having an output circuit which includes said coil and comprises variable reactance means for changing the excitation frequency in dependence upon pressure change in said gas-pressure supply means.

References Cited in the file of this patent
UNITED STATES PATENTS

| | | |
|---|---|---|
| 2,336,930 | Dyer | Dec. 14, 1943 |
| 2,846,598 | Zerigian | Aug. 5, 1958 |